US012486954B2

(12) United States Patent
Tsai

(10) Patent No.: US 12,486,954 B2
(45) Date of Patent: Dec. 2, 2025

(54) CHRISTMAS TREE DECORATION LIGHTS AND CONNECTION METHOD

(71) Applicant: Cheng-Hung Tsai, Shenzhen (CN)

(72) Inventor: Cheng-Hung Tsai, Shenzhen (CN)

( * ) Notice: Subject to any disclaimer, the term of this patent is extended or adjusted under 35 U.S.C. 154(b) by 22 days.

(21) Appl. No.: 18/646,679

(22) Filed: Apr. 25, 2024

(65) Prior Publication Data

US 2025/0297713 A1 Sep. 25, 2025

(30) Foreign Application Priority Data

Mar. 19, 2024 (CN) ......................... 202410315023.5

(51) Int. Cl.

| | |
|---|---|
| ***F21S 2/00*** | (2016.01) |
| ***F21S 4/10*** | (2016.01) |
| ***F21V 23/06*** | (2006.01) |
| ***H01R 13/52*** | (2006.01) |
| ***H01R 13/623*** | (2006.01) |
| ***H01R 13/645*** | (2006.01) |
| ***H01R 24/00*** | (2011.01) |
| ***H01R 24/86*** | (2011.01) |
| *F21W 121/04* | (2006.01) |
| *F21Y 107/70* | (2016.01) |
| *H01R 103/00* | (2006.01) |

(52) U.S. Cl.

CPC ................. *F21S 2/005* (2013.01); *F21S 4/10* (2016.01); *F21V 23/06* (2013.01); *H01R 13/5219* (2013.01); *H01R 13/623* (2013.01); *H01R 13/6456* (2013.01); *H01R 24/005* (2013.01); *H01R 24/86* (2013.01); *F21W 2121/04* (2013.01); *F21Y 2107/70* (2016.08); *H01R 2103/00* (2013.01)

(58) Field of Classification Search

CPC .. F21S 2/005; F21S 4/10; F21V 23/06; H01R 13/5219; H01R 13/623; H01R 13/6456; H01R 24/005; H01R 24/86

See application file for complete search history.

(56) References Cited

U.S. PATENT DOCUMENTS

| | | | | |
|---|---|---|---|---|
| 6,883,951 | B2 * | 4/2005 | Wu | F21V 23/06 362/567 |
| 12,359,801 | B1 * | 7/2025 | Ruan | F21V 23/06 |
| 12,404,997 | B2 * | 9/2025 | Zhang | F21V 23/001 |

(Continued)

*Primary Examiner* — Christopher E Dunay
(74) *Attorney, Agent, or Firm* — Birchwood IP

(57) ABSTRACT

Disclosed are Christmas tree decoration lights and a connection method, the Christmas tree decoration lights include a first-level connecting structure being composed of a first-level main plug and a first-level branch plug, a second-level connecting structure being composed of a second-level main plug and a second-level branch plug, and a third-level connecting structure being composed of a third-level plug and lamp tubes; the first-level main plug is connected with a connection power interface, the first-level connecting structure is fixed on a main pole of an object, and a plurality of the second-level main plugs are connected with the first-level branch plugs at different heights; the second-level connecting structure is annularly surrounded on a plane of the main pole of the object, the third-level plug is connected with the second-level branch plug, and the third-level connecting structure is horizontally spread out and attached to a support rod of the object.

9 Claims, 7 Drawing Sheets

(56) References Cited

U.S. PATENT DOCUMENTS

| | | | | |
|---|---|---|---|---|
| 2006/0261745 | A1 * | 11/2006 | Beitler .................. | H05B 39/00 315/185 R |
| 2007/0195516 | A1 * | 8/2007 | Cheng ...................... | F21S 4/10 362/249.01 |

* cited by examiner

CHRISTMAS TREE DECORATION LIGHTS AND CONNECTION METHOD

TECHNICAL FIELD

The present disclosure relates to the field of decoration lights, and particularly relates to Christmas tree decoration lights and a connection method.

BACKGROUND ART

Nowadays, LED lights have been widely used as string lights for a Christmas tree. With many advantages such as energy saving, environmental protection, and long service life, the LED lights can better meet people's needs for Christmas decoration. Moreover, with the advancement of technology, color and brightness of the LED lights have been greatly improved, providing more possibilities for design and production of the string lights for the Christmas tree.

However, due to special design, the string lights for the Christmas tree have many connecting sockets, but connection methods for the string lights for the Christmas tree are relatively single. The string lights for the Christmas tree in China are mostly exported overseas. However, affected by many factors, such as long-distance transportation, decoration placement, and adverse weather conditions, the connecting sockets are easy to become loose. The instability of the connecting sockets leads to a low yield rate of the string lights for the Christmas tree. Besides, the complexity of a circuit of the string lights makes the troubleshooting of each fault very difficult. Many customer feedbacks have proved that instable connection of the string lights for the Christmas tree has troubled both businesses and users. In order to solve the problem of wasting manpower and financial resources caused by the instable connection, the present disclosure provides Christmas tree decoration lights and a connection method.

SUMMARY

An objective of the present disclosure is to provide Christmas tree decoration lights and a connection method, to solve the problems stated in the above background.

In order to achieve the above objective, the present disclosure provides the following technical solution:

the present disclosure provides Christmas tree decoration lights, including a first-level connecting structure, a second-level connecting structure, a third-level connecting structure and connecting wires, a head end and a tail end of the second-level connecting structure are connected with the first-level connecting structure and the third-level connecting structure, respectively, where:

the first-level connecting structure includes a first-level main plug, a first-level branch plug and a sealing cover; the first-level main plug is arranged at a connection end of the first-level connecting structure, one end of the first-level main plug is connected with the first-level branch plug through a connecting wire, and ends of the first-level branch plug are connected sequentially through a connecting wire, and the sealing cover is sleeved on a periphery of a connection end of the first-level main plug; and the second-level connecting structure is connected with the first-level branch plug, the second-level connecting structure includes a second-level main plug, a second-level branch plug and a sealing cover; the second-level main plug is arranged at a connection end of the second-level connecting structure, one end of the second-level main plug can be connected with the second-level branch plug through a connecting wire, ends of the second-level branch plug are connected sequentially through a connecting wire, a fool-proofing groove is formed on a bottom end of a connection port of a second-level branch plug body, a first-level inner convex ring and a second-level inner convex ring are arranged on an inner side of the second-level branch plug body, and the sealing cover is sleeved on a periphery of a connection end of the second-level main plug.

The third-level connecting structure is connected with the second-level main plug, and the third-level connecting structure includes a third-level plug and lamp tubes; the third-level plug is arranged at a connection end of the third-level connecting structure, a fool-proofing hole is formed on a bottom end of a connection port of a third-level plug body, a first-level outer convex ring and a second-level outer convex ring are arranged on an outer side of the third-level plug body, the fool-proofing hole of the third-level plug is matched with the fool-proofing groove of the second-level branch plug body, the three-level plug is connected with two lamp tubes, respectively, one ends of the lamp tube at head and tail ends are connected with the three-level plug, and the other ends thereof are connected with the lamp tubes, such that the three-level plug and the lamp tubes form a closed loop.

The present disclosure further provides an extended connecting structure, where the extended connecting structure includes an extension main plug and at least two extension branch plugs, the extension main plug can be connected with the second-level branch plug.

Further, the fool-proofing groove is a T-shaped convex groove.

Further, the fool-proofing hole is a rectangular concave hole, and a size of the concave hole is matched with a convex part of the T-shaped convex groove.

Further, a connection port of the second-level branch plug can be plugged and fixed with the third-level plug, and the first-level inner convex ring and the second-level inner convex ring form a snap-in connection with the first-level outer convex ring and the second-level outer convex ring.

Further, connection parts between the first-level inner convex ring and the second-level inner convex ring, and the first-level outer convex ring and the second-level outer convex ring are smooth arcs.

Further, holding grooves are formed on a tail portion of a first-level main plug body, and each of the holding grooves is composed of a plurality of concave holes.

Further, an anti-sliding groove is formed on an outer side of the first-level main plug body, and the anti-sliding groove is composed of a plurality of convex stop rods.

Further, the first-level main plug includes first-level electrical pins, and the first-level electrical pins are fixed on an inner side of the first-level main plug body.

Further, the second-level main plug includes second-level electrical pins, and the first-level electrical pins are fixed on the inner side of the first-level main plug body.

Further, the first-level branch plug includes first-level plug holes, the first-level plug holes are matched with the second-level electrical pins, and threads are arranged on an outer side of a first-level branch plug body.

Further, the second-level branch plug includes third-level electrical pins, and the third-level electrical pins are fixed on the inner side of the second-level branch plug body.

Further, the third-level plug includes second-level plug holes, the second-level plug holes are matched with the third-level electrical pins, and threads are arranged on an outer side of the third-level plug body.

Further, the sealing cover is a hollow circular ring, a tail hole thereof is smaller than outer sides of connecting ends of the first-level main plug, the second-level main plug and the second-level branch plug, threads are arranged on an inner side of the sealing cover, and the threads on the inner side of the sealing cover are matched with the threads on the outer sides of the first-level branch plug body and the three-level plug body.

Further, the first-level main plug, the second-level main plug and the first-level branch plug are each provided with the holding grooves and the anti-sliding groove, with features consistent with those of the second-level branch plug and the third-level plug.

Further, a filled fool-proofing rod is arranged on an inner side of circular ring of each of the first-level main plug body and the second-level main plug body, respectively, and a notch corresponding to the fool-proofing rod is arranged on the first-level branch plug.

Further, an outer convex ring is formed on each of the first-level main plug body and the second-level main plug body, respectively, and an inner convex ring corresponding to the convex ring is formed on the first-level branch plug.

A connection method of the Christmas tree decoration lights, where the first-level main plug is connected with a connection power interface, the first-level connecting structure is fixed upwardly around a main pole of an object, and a plurality of the second-level main plugs are connected with the first-level branch plugs at different heights in sequence; the second-level connecting structure is annularly surrounded on a plane of the main pole of the object, the third-level plug is then connected with the second-level branch plug, the third-level connecting structure is horizontally spread out and attached to a support rod of the object, and the sealing covers are rotated and fixed in sequence in the process of connection.

Compared with the prior art, the present disclosure has the following beneficial effects:

the present disclosure provides Christmas tree decoration lights and a connection method, a T-shaped fool-proofing structure is arranged at a connection between the second-level branch plug and the second-level main plug to prevent wrong connection of positive and negative electrodes during connection; the outer convex rings are arranged at the first-level and second-level branch plug bodies, and the inner convex rings are correspondingly arranged at the first-level and third-level plug bodies, such that the connection points become more stable, and the Christmas tree decoration lights are difficult to be disconnected during the transportation and placement; the third-level connecting structure makes the placement of the Christmas tree decoration lights more flexible and convenient, the threads are arranged on the outer sides of the first-level and third-level plugs, and can be connected with the threads of the sealing cover when not in use; and a ladder is arranged on the bottom of the connecting body, a seal is formed through the sealing cover when it is connected, such that water ingress is prevented during use, and the method features stability, easy to operate, strong adaptability, and the like.

Figure 1:
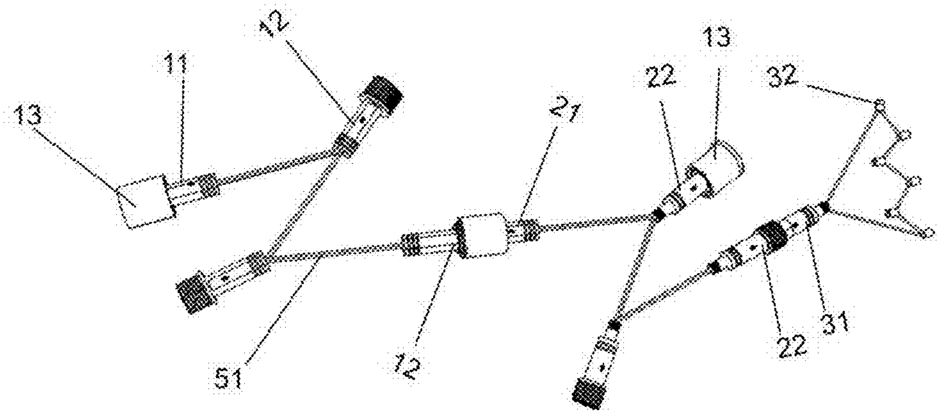
FIG. 1 is a three-dimensional structural diagram of Christmas tree decoration lights in the present disclosure.

Reference numerals in FIG. 1: 11. first-level main plug; 12. first-level branch plug; 13. sealing cover; 21. second-level main plug; 22. second-level branch plug; 31. third-level plug; 32. lamp tube; and 51. connecting wire.

Figure 2:
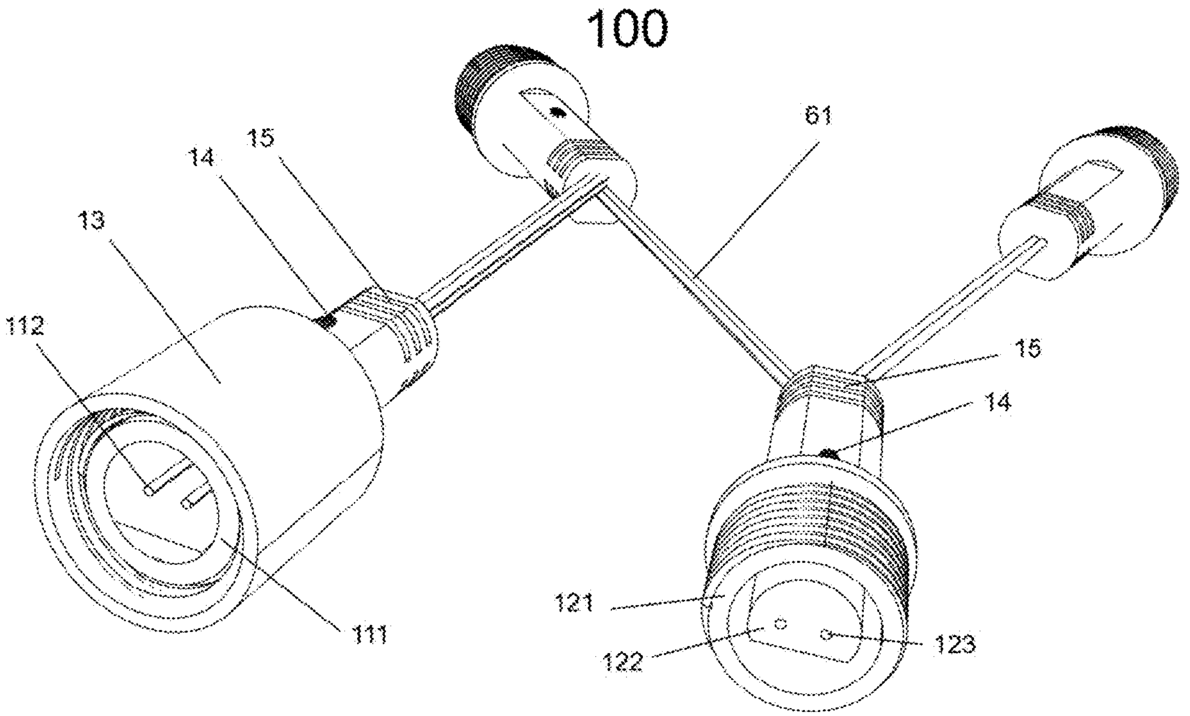

FIG. 2 is a structural diagram of a first-level connecting structure of Christmas tree decoration lights in the present disclosure.

Reference numerals in FIG. 2: 111. first-level main plug body; 112. first-level electrical pin; 13. sealing cover; 14. anti-sliding groove; 15. holding groove; 121. first-level branch plug body; 122. plug-in body; 123. first-level plug hole; and 51. connecting wire.

Figure 3:
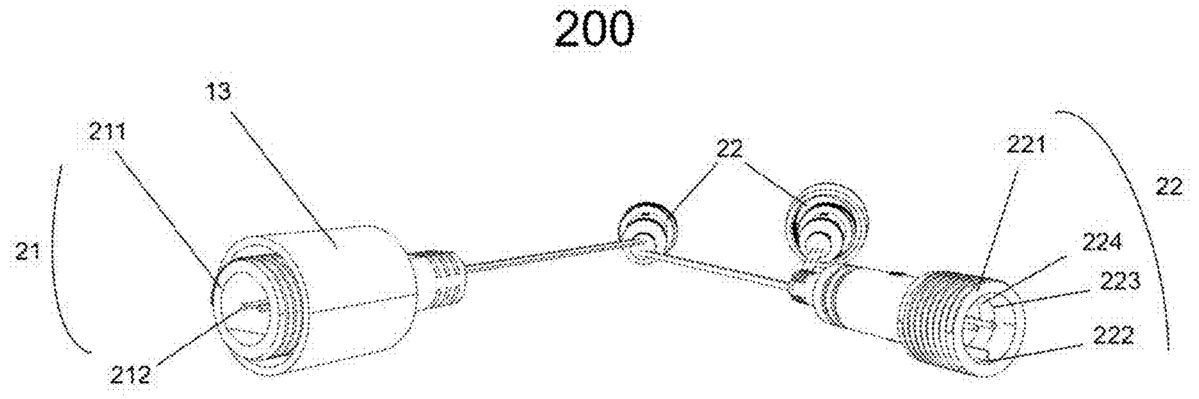

FIG. 3 is a structural diagram of a second-level connecting structure of Christmas tree decoration lights in the present disclosure.

Reference numerals in FIG. 3: 211. second-level main plug body; 212. second-level electrical pin; 13. sealing cover; 221. second-level branch plug body; 222. fool-proofing groove; 223. first-level inner convex ring; and 224. second-level inner convex ring.

Figure 4:
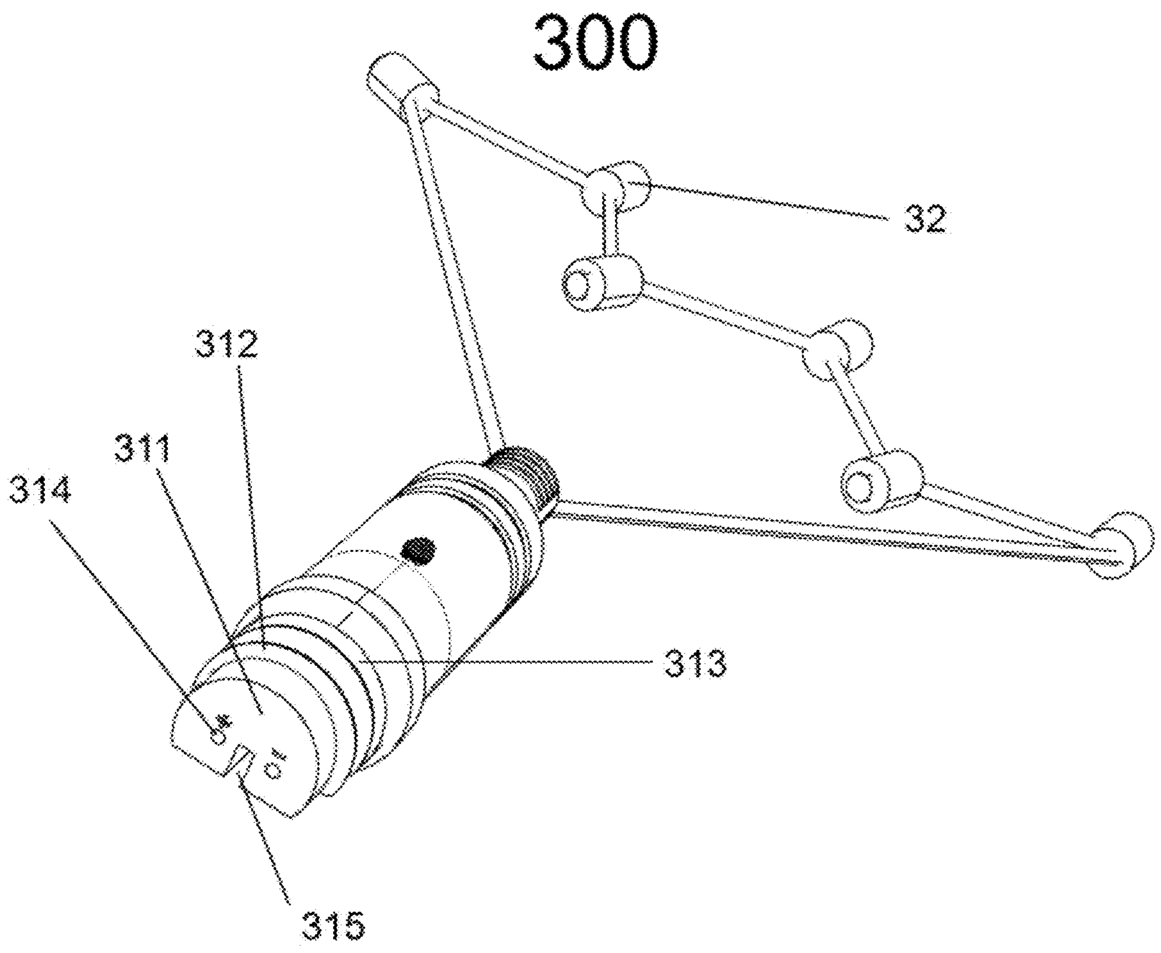

FIG. 4 is a structural diagram of a third-level connecting structure of Christmas tree decoration lights in the present disclosure.

Reference numerals in FIG. 4: 311. third-level plug body; 312. first-level outer convex ring; 313. second-level outer convex ring; 314. second-level plug hole; 315. fool-proofing hole; and 32. limp tube.

Figure 5:
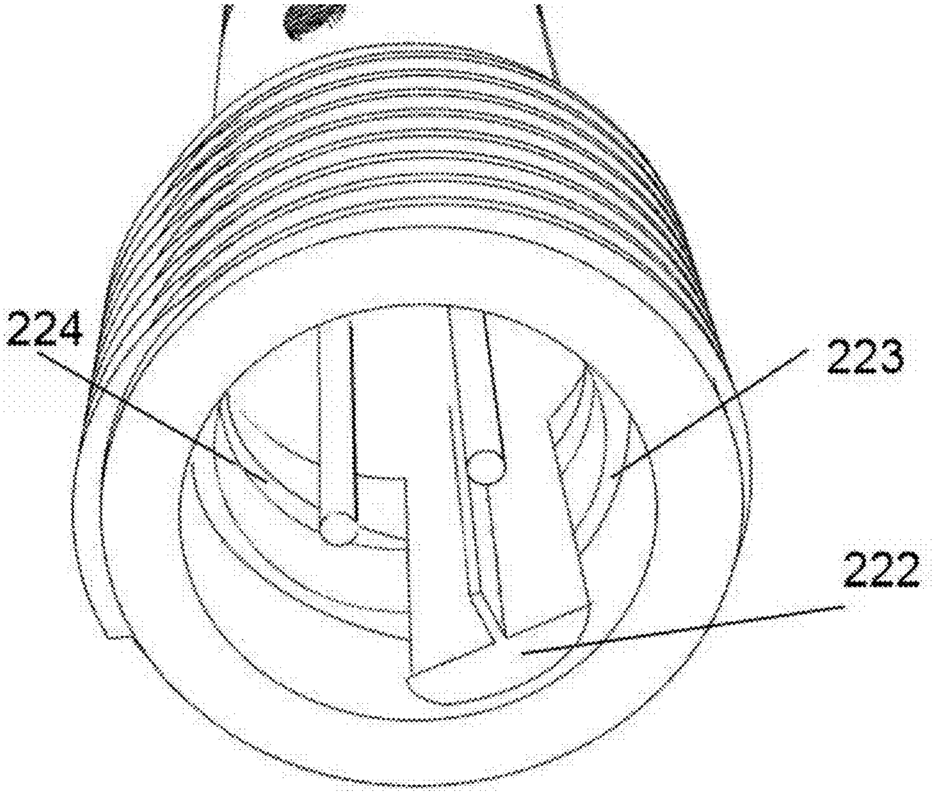

FIG. 5 is an internal structural diagram of a second-level branch plug of Christmas tree decoration lights in the present disclosure.

Reference numerals in FIG. 5: 222. fool-proofing groove; 223. first-level inner convex ring; and 224. second-level inner convex ring.

Figure 6:
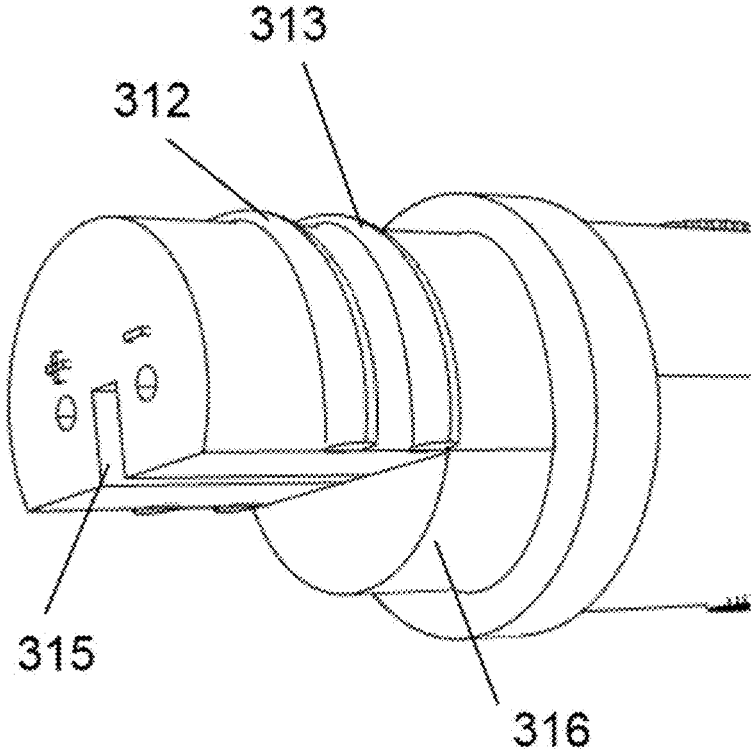

FIG. 6 is a structural diagram from a bottom view of a three-level plug of Christmas tree decoration lights in the present disclosure.

Reference numerals in FIG. 6: 316. sealing ring.

Figure 7:
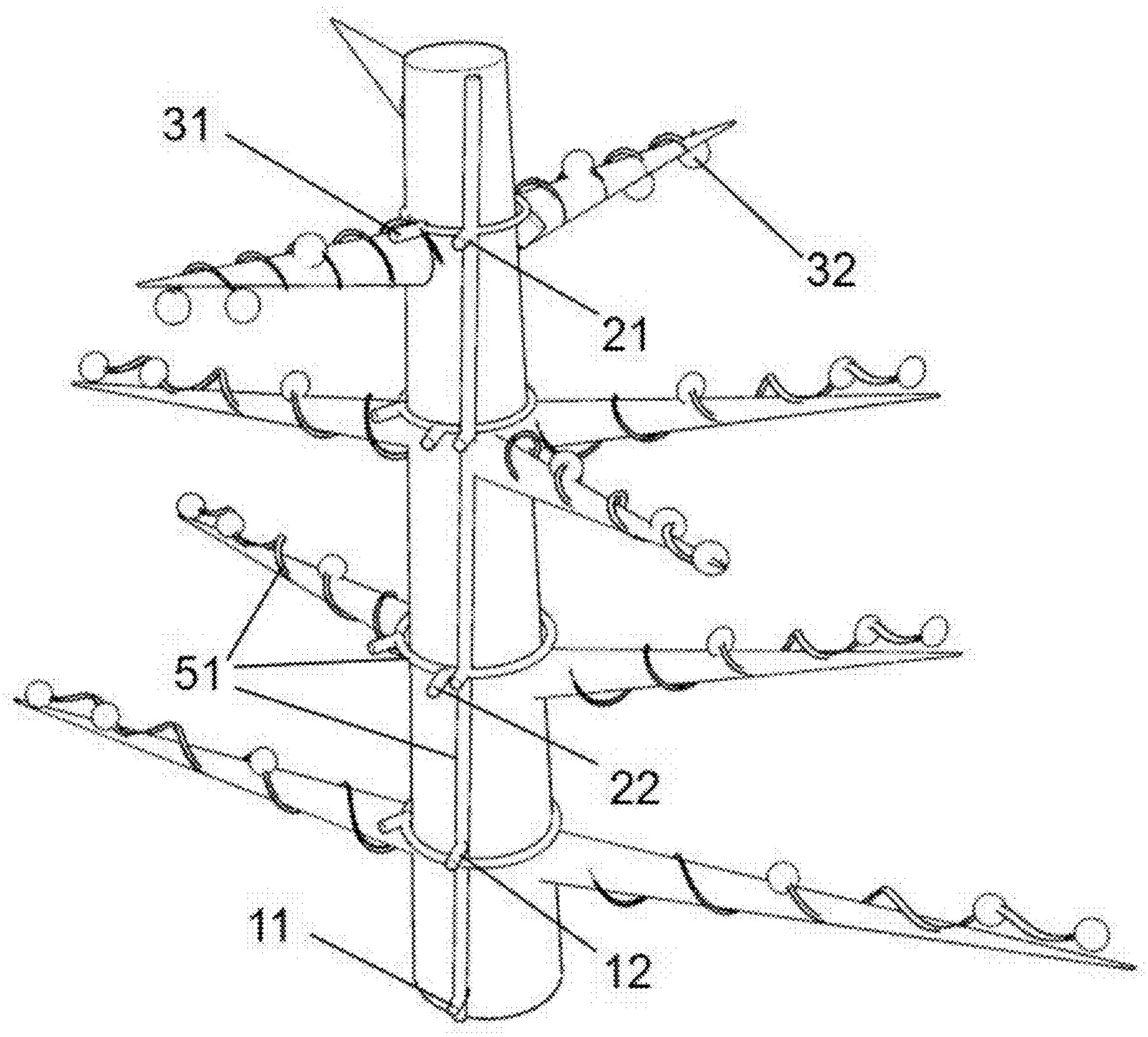

FIG. 7 is a three-dimensional structural diagram of placement of Christmas tree decoration lights in the present disclosure.

Reference numerals in FIG. 7: 11. first-level main plug; 12. first-level branch plug; 21. second-level main plug; 22. second-level branch plug; 31. third-level plug; 32. lamp tube; and 51. connecting wire.

Figure 8:
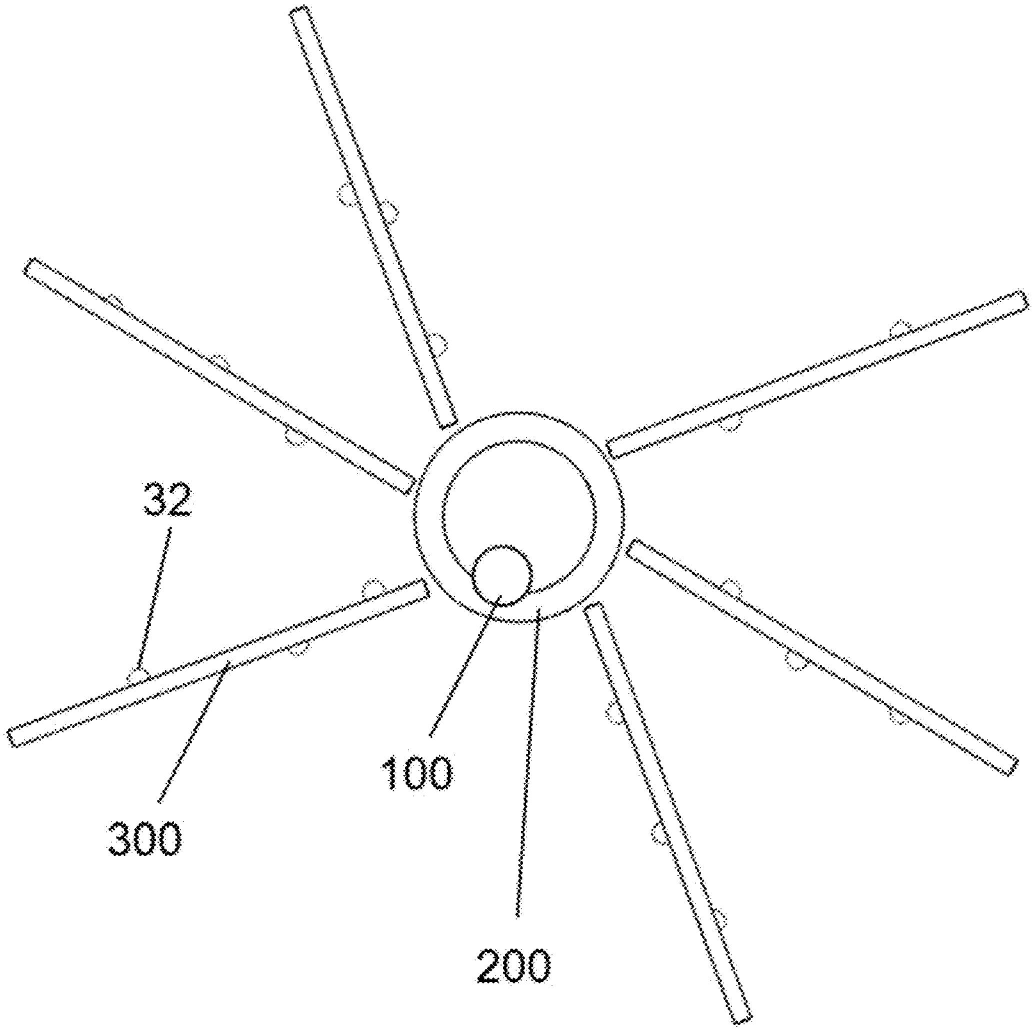

FIG. 8 is a schematic plan view of connecting structures of Christmas tree decoration lights in the present disclosure.

Reference numerals in FIG. 8: 100. first-level connecting structure; 200. second-level connecting structure; 300. third-level connecting structure; and 32. lamp tube.

Figure 9:
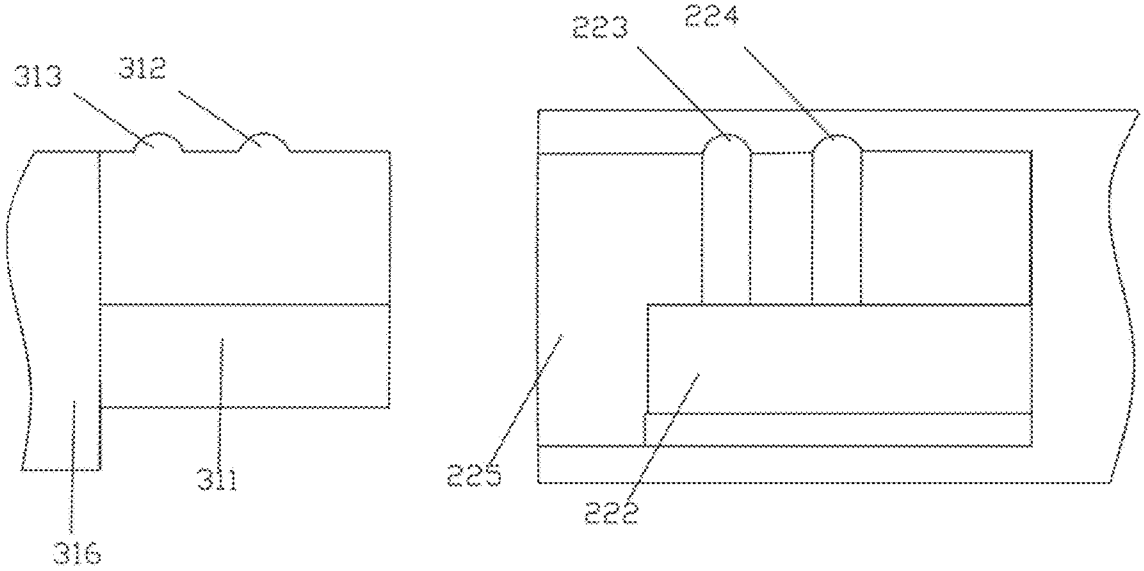

FIG. 9 is a sectional view of a connection between a second-level connecting structure and a third-level connecting structure of Christmas tree decoration lights in the present disclosure.

Reference numerals in FIG. 9: 222. fool-proofing groove; 223. first-level inner convex ring; 224. second-level inner convex ring; 225. sealing cavity; 311. third-level plug body; 312. first-level outer convex ring; 313. second-level outer convex ring; and 316. sealing ring.

Figure 10:
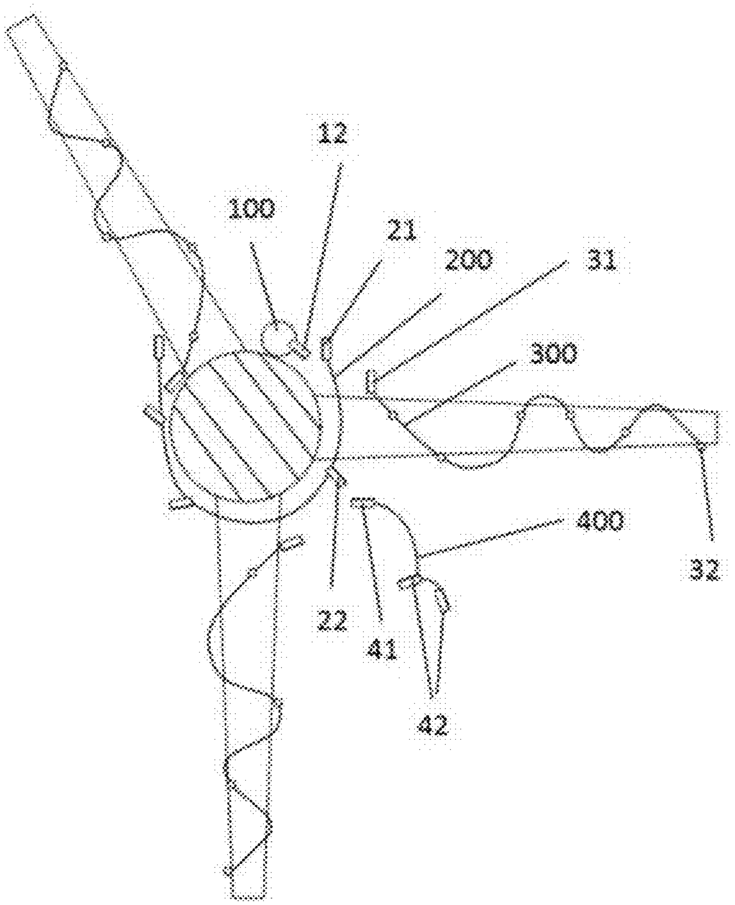

FIG. 10 is a schematic diagram of a connection of an extended connecting structure of Christmas tree decoration lights in the present disclosure.

Reference numerals in FIG. 10: 100. first-level connecting structure; 200. second-level connecting structure; 300. third-level connecting structure; 400. extended connecting structure; 12. first-level main plug; 21. second-level main plug;

22. second-level branch plug; 31. third-level plug; 32. lamp tube; 41. extension main plug; and 42. extension branch plug.

Figure 11:
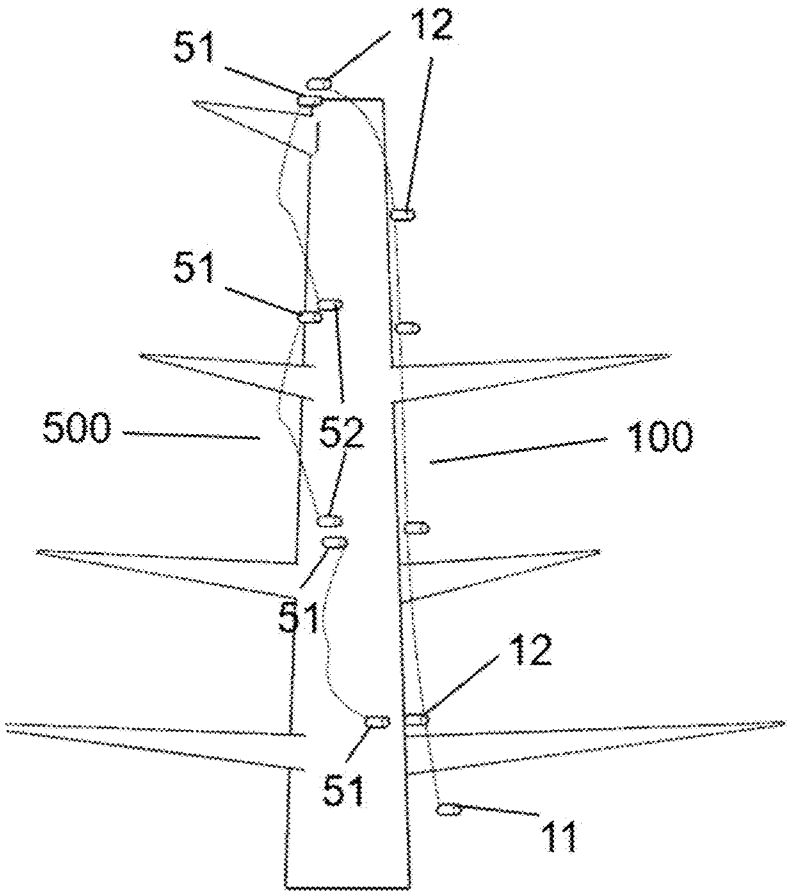

FIG. 11 is a schematic diagram of a connection of a shunt connecting structure of Christmas tree decoration lights in the present disclosure.

Reference numerals in FIG. 11: 100. first-level connecting structure; 11. first-level main plug; 12. first-level branch plug; 500. shunt connecting structure; 51. shunt main plug; and 52. shunt branch plug.

DETAILED DESCRIPTION OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

With reference to FIGS. 1-5, the present disclosure provides Christmas tree decoration lights, including a first-level connecting structure 100, a second-level connecting structure 200, a third-level connecting structure 300 and connecting wires, where a head end and a tail end of the second-level connecting structure 200 are connected with the first-level connecting structure 100 and the third-level connecting structure 300, respectively, and the first-level connecting structure 100 includes a first-level main plug 11, a first-level branch plug 12 and a sealing cover 13; the first-level main plug 11 is arranged at a connection end of the first-level connecting structure 100, the first-level main plug 11 includes first-level electrical pins 112, the first-level electrical pins 112 are fixed on an inner side of the first-level main plug body 111, holding grooves 15 are formed on a tail portion of the first-level main plug body 111, and each of the holding grooves 15 is composed of a plurality of concave holes; an anti-sliding groove 14 is formed on an outer side of the first-level main plug body 111, and the anti-sliding groove 14 is composed of a plurality of convex stop rods; one end of the first-level main plug 11 is connected with the first-level branch plug 12 through a connecting wire 51, and ends of the first-level branch plug 12 are connected sequentially through a connecting wire 51; and the first-level branch plug 12 includes a plug-in body 122 and first-level plug holes 123, the first-level plug holes 123 are formed on the plug-in body 122, and the first-level plug holes 123 are matched with the second-level electrical pins 212, threads are arranged on an outer side of a first-level branch plug body 121, and the sealing cover 13 is sleeved on a periphery of a connection end of the first-level main plug 11;

the second-level connecting structure 200 is connected with the first-level branch plug 12, where the second-level connecting structure 200 includes a second-level main plug 21, a second-level branch plug 22 and a sealing cover 13; the second-level main plug 21 is arranged at a connection end of the second-level connecting structure 200, the second-level main plug 21 includes second-level electrical pins 212, where the second-level electrical pins 212 are fixed on an inner side of a second-level main plug body 211, one end of the second-level main plug 21 can be connected with the second-level branch plug 22 through a connecting wire 51, and ends of the second-level branch plug 22 are connected sequentially through a connecting wire 51; a fool-proofing groove 222 is formed on a bottom end of a connection port of a second-level branch plug body 221, the fool-proofing groove 222 is a T-shaped convex groove, and a first-level inner convex ring 223 and a second-level inner convex ring 224 are arranged on an inner side of the second-level branch plug body 221; and the second-level branch plug 22 includes third-level electrical pins, the third-level electrical pins are fixed on the inner side of the second-level branch plug body 221, the sealing cover 13 is sleeved on a periphery of a connection end of the second-level main plug 21, and the first-level inner convex ring 223 and the second-level inner convex ring 224 are small circular rings protruding along an inner wall of a connecting cavity of the second-level branch plug 22.

With reference to FIGS. 3-6, the third-level connecting structure 300 is connected with the second-level main plug 21, and the third-level connecting structure 300 includes a third-level plug 31 and lamp tubes 32; the third-level plug 31 is arranged at a connection end of the third-level connecting structure 300, a fool-proofing hole 315 is formed on a bottom end of a connection port of a third-level plug body 311, the fool-proofing hole 315 is a rectangular concave hole, and a size of the concave hole is matched with a convex part of the T-shaped convex groove; and the third-level plug 31 includes second-level plug holes 314, the second-level plug holes 314 are matched with the third-level electrical pins, and threads are arranged on an outer side of the third-level plug body 311. A first-level outer convex ring 312 and a second-level outer convex ring 313 are arranged on the outer side of the third-level plug body 311, the first-level outer convex ring 312 and the second-level outer convex ring 313 are semi-circular rings protruding along an outer wall of a connecting body of the third-level plug 31, the fool-proofing hole 315 of the third-level plug is matched with the fool-proofing groove 222 of the second-level branch plug body, a connection port of the second-level branch plug 22 can be plugged and fixed with the third-level plug 31, the first-level inner convex ring 223 and the second-level inner convex ring 224 form a snap-in connection with the first-level outer convex ring 312 and the second-level outer convex ring 313, and connection parts between the first-level inner convex ring 223 and the second-level inner convex ring 224, and the first-level outer convex ring 312 and the second-level outer convex ring 313 are smooth arcs. The three-level plug 31 is connected with two lamp tubes 32, respectively, one ends of the lamp tube 32 at head and tail ends are connected with the three-level plug 31, and the other ends thereof are connected with the lamp tubes 32, such that the three-level plug 31 and the lamp tubes 32 form a closed loop.

Further, the sealing cover 13 is a hollow circular ring, a tail hole thereof is smaller than outer sides of connecting ends of the first-level main plug 11, the second-level main plug 21 and the second-level branch plug 22, threads are arranged on an inner side of the sealing cover 13, and the threads on the inner side of the sealing cover 13 are matched with the threads on the outer sides of the first-level branch plug body 121 and the three-level plug body 311.

Further, the first-level main plug 11, the second-level main plug 21 and the first-level branch plug 12 are each provided with the holding grooves 15 and the anti-sliding groove 14, with technical features being consistent with those of the second-level branch plug 22 and the third-level plug 31.

Further, a filled fool-proofing rod is arranged on an inner side of circular ring of each of the first-level main plug body

111 and the second-level main plug body 211, respectively, and a notch corresponding to the fool-proofing rod is arranged on the first-level branch plug 12.

Further, an outer convex ring is formed on each of the first-level main plug body 111 and the second-level main plug body 211, respectively, and an inner convex ring corresponding to the convex ring is formed on the first-level branch plug 12.

With reference to FIGS. 6 and 9, further, a sealing ring 316 is arranged on a bottom side of the fool-proofing hole 315 the third-level plug 31, a lower side of the connecting body of the third-level plug body 311 is a concave surface, and the sealing ring 316 forms a ladder with the concave surface of the connecting body of the third-level plug body; similarly, a spacing is reserved between the fool-proofing groove 222 of the second-level branch plug 22 and the connection port (that is, an outer end of the connection port of the second-level branch plug 22) thereof, a sealing cavity 225 is reserved at the outer end of the fool-proofing groove 222 of the second-level branch plug 22, a width of the sealing ring 316 is consistent with a width of the sealing cavity 225, and when the second-level branch plug 22 is plugged and connected with the third-level plug 31, the sealing ring 316 is matched with the sealing cavity 225, ensuring a completely sealed connection internally to prevent water ingress and electrical leakage.

With reference to FIGS. 7, 8 and 10, a connection method of the Christmas tree decoration lights, where the first-level main plug 11 is connected with a connection power interface, the first-level connecting structure 100 is fixed upwardly around a main pole of an object, and a plurality of the second-level main plugs 21 are connected with the first-level branch plugs 12 at different heights in sequence; the second-level connecting structure 200 is annularly surrounded on a plane of the main pole of the object, the third-level plug 31 is then connected with the second-level branch plug 22, the third-level connecting structure 300 is horizontally spread out and attached to a support rod of the object, and the sealing covers 13 are rotated and fixed in sequence in the process of connection; when the connecting wires of the second-level connecting structure 200 are short or the second-level branch plugs 22 are insufficient, an extended connecting structure 400 can be introduced and connected with the second-level branch plug 22, where the extended connecting structure 400 includes an extension main plug 41 and at least two extension branch plugs 42, the extension main plug 41 can be connected with the second-level branch plug 22, the extension branch plug 42 can be connected with the third-level plug 31, or can be connected with a device, such as external decoration, which greatly improves the extensibility of the Christmas tree decoration lights.

With reference to FIG. 11, a shunt connecting structure 500 is provided, the shunt connecting structure 500 includes shunt main plugs 51 and shunt branch plugs 52, where the shunt main plugs 51 are connected with the first-level branch plugs 12, respectively, wires in a middle part and a tail part of the shunt connecting structure 500 are all the shunt main plugs 51 at a head part, and the shunt branch plugs 52 at a tail part, the shunt main plugs 51 and the shunt branch plugs 52 can be connected in series according to the actual length requirements, both head and tail ends of a wire at a most head end of the shunt connecting structure 500 are both the shunt main plugs 51, which ensures that the head and tail ends of the shunt connecting structure 500 are the shunt main plugs 51, and the shunt main plugs 51 at the head and tail ends can be connected with the first-level connecting structure 100, such that a circuit of the connecting wire can be shunted and lamp tubes at different positions of the connecting wire can have uniform illumination.

The present disclosure provides Christmas tree decoration lights and a connection method, the T-shaped fool-proofing structure is arranged at a connection between the second-level branch plug and the second-level main plug to prevent wrong connection of positive and negative electrodes during connection; the outer convex rings are arranged at the first-level and second-level branch plug bodies, and the inner convex rings are correspondingly arranged at the first-level and third-level plug bodies, such that the connection points become more stable, and the Christmas tree decoration lights are difficult to be disconnected during the transportation and placement; the third-level connecting structure makes the placement of the Christmas tree decoration lights more flexible and convenient, the threads are arranged on the outer sides of the first-level and third-level plugs, and can be connected with the threads of the sealing cover when not in use; and a ladder is arranged on the bottom of the connecting body, a seal is formed through the sealing cover when it is connected, such that water ingress is prevented during use, and the method features stability, easy to operate, strong adaptability, and the like.

The foregoing description, merely being an optimal specific implementation mode of the present disclosure, is not intended to limit the scope of protection of the present disclosure, and any equivalent substitution or change made by those skilled in the art according to the technical solution of the present disclosure and the inventive concept thereof within the technical scope of the present disclosure is intended to be encompassed within the scope of protection of the present disclosure.

What is claimed is:

1. Christmas tree decoration lights, comprising a first-level connecting structure, a second-level connecting structure, a third-level connecting structure and connecting wires,
- wherein a head end and a tail end of the second-level connecting structure are connected with the first-level connecting structure and the third-level connecting structure, respectively;
- the first-level connecting structure comprises a first-level main plug, and a first-level branch plug, the second-level connecting structure comprises a second-level main plug and a second-level branch plug, and the third-level connecting structure comprises a third-level plug and lamp tubes;
- the first-level connecting structure and the second-level connecting structure are connected with the second-level main plug through the first-level branch plug, and the second-level connecting structure and the third-level connecting structure are connected with the third-level plug through the second-level branch plug;
- a fool-proofing groove is formed on a bottom end of a connection port of a second-level branch plug body, the third-level plug is arranged at a connection end of the third-level connecting structure, a fool-proofing hole is formed on a bottom end of a connection port of a third-level plug body, and the fool-proofing hole is matched with the fool-proofing groove; and
- the second-level branch plug body has a connecting cavity inside, at least one inner convex ring is arranged on an inner wall of the connecting cavity, the third-level plug body comprises a connecting body, at least one outer convex ring is arranged on an outer side of the connecting body, the at least one inner convex ring and the at least one outer convex ring are in snap-in connection when they are inserted for connection, a lower side of the connecting body of the third-level plug body is a concave surface, a sealing ring is arranged on a tail end of the connecting body, and the sealing ring forms a ladder with the concave surface of the connecting body of the third-level plug body; and a sealing cavity is reserved at an outer end of the fool-proofing groove, and when the second-level branch plug is plugged and connected with the third-level plug, the sealing ring is matched with the sealing cavity to form a sealing structure.

2. The Christmas tree decoration lights according to claim 1, wherein the first-level main plug is arranged at a connection end of the first-level connecting structure, one end of the first-level main plug is connected with the first-level branch plug through a connecting wire, and ends of the first-level branch plug are connected sequentially through a connecting wire; and the first-level connecting structure and the second-level connecting structure each comprises a sealing cover, and the sealing cover is sleeved on a periphery of a connection end of the first-level main plug;

the second-level connecting structure is connected with the first-level branch plug, the second-level main plug is arranged at a connection end of the second-level connecting structure, one end of the second-level main plug is connected with the second-level branch plug through a connecting wire, ends of the second-level branch plug are connected sequentially through a connecting wire, and the sealing cover is sleeved on a periphery of a connection end of the second-level main plug;

the third-level connecting structure is connected with the second-level main plug, the three-level plug is connected with two lamp tubes, respectively, one ends of the lamp tube at head and tail ends are connected with the three-level plug, and the other ends thereof are connected with the lamp tubes, such that the three-level plug and the lamp tubes form a closed loop; and comprising an extended connecting structure, wherein the extended connecting structure comprises an extension main plug and at least two extension branch plugs, and the extension main plug can be connected with the second-level branch plug.

3. The Christmas tree decoration lights according to claim 2, wherein the fool-proofing groove is a T-shaped convex groove, the fool-proofing hole is a rectangular concave hole, and a size of the concave hole is matched with a convex part of the T-shaped convex groove.

4. The Christmas tree decoration lights according to claim 2, wherein a connection port of the second-level branch plug can be plugged and fixed with the third-level plug, a first-level inner convex ring and a second-level inner convex ring form a snap-in connection with a first-level outer convex ring and a second-level outer convex ring, and connection parts between the first-level inner convex ring and the second-level inner convex ring, and the first-level outer convex ring and the second-level outer convex ring are smooth arcs.

5. The Christmas tree decoration lights according to claim 2, wherein holding grooves are formed on a tail portion of a first-level main plug body, and each of the holding grooves is composed of a plurality of concave holes; an anti-sliding groove is formed on an outer side of the first-level main plug body, and the anti-sliding groove is composed of a plurality of convex stop rods; and the first-level main plug comprises first-level electrical pins, and the first-level electrical pins are fixed on an inner side of the first-level main plug body.

6. The Christmas tree decoration lights according to claim 2, wherein the second-level main plug comprises second-level electrical pins, and the second-level electrical pins are fixed on an inner side of a second-level main plug body.

7. The Christmas tree decoration lights according to claim 6, wherein the first-level branch plug comprises first-level plug holes, and the first-level plug holes are matched with the second-level electrical pins.

8. The Christmas tree decoration lights according to claim 1, wherein the second-level branch plug comprises third-level electrical pins, and the third-level electrical pins are fixed on an inner side of the second-level branch plug body.

9. The Christmas tree decoration lights according to claim 8, wherein the third-level plug comprises second-level plug holes, and the second-level plug holes are matched with the third-level electrical pins.

* * * * *